(12) United States Patent
Shinozaki et al.

(10) Patent No.: US 8,404,761 B2
(45) Date of Patent: Mar. 26, 2013

(54) WHITE INK FOR INKJET

(75) Inventors: Masami Shinozaki, Inashiki-gun (JP); Hiroyuki Ogawa, Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 102 days.

(21) Appl. No.: 12/654,818

(22) Filed: Jan. 5, 2010

(65) Prior Publication Data
US 2010/0190922 A1  Jul. 29, 2010

(30) Foreign Application Priority Data

Jan. 28, 2009  (JP) ................ P2009-016933

(51) Int. Cl.
| | |
|---|---|
| *B41J 2/01* | (2006.01) |
| *B41J 2/17* | (2006.01) |
| *B41J 2/175* | (2006.01) |
| *B60C 1/00* | (2006.01) |
| *C08K 3/22* | (2006.01) |
| *C08K 3/34* | (2006.01) |
| *C09D 5/00* | (2006.01) |
| *C09D 11/00* | (2006.01) |
| *G01D 11/00* | (2006.01) |

(52) U.S. Cl. ............... 523/160; 347/1; 347/85; 347/95; 347/100; 523/161; 524/492; 524/493; 524/497

(58) Field of Classification Search ............ 523/160, 523/161, 220, 334; 524/492, 493, 497; 347/1, 347/85, 95, 100
See application file for complete search history.

(56) References Cited

U.S. PATENT DOCUMENTS
7,052,730 B2 *  5/2006  Patel et al. ............ 427/7

FOREIGN PATENT DOCUMENTS
JP  2004-339388 A  12/2004

* cited by examiner

*Primary Examiner* — Patrick Niland
(74) *Attorney, Agent, or Firm* — Nath, Goldberg & Meyer; Jerald L. Meyer; Megan B. Doughty

(57) ABSTRACT

A white ink for an inkjet, comprising a silica, a resin emulsion, and water, wherein an amount of the resin emulsion, reported as a mass ratio relative to a value of 1 for the silica, is within a range from 0.10 to 0.45.

4 Claims, No Drawings

WHITE INK FOR INKJET

CROSS REFERENCE TO RELATED APPLICATIONS

This Application is based upon and claims the benefit of priority from prior Japanese Patent Application No. 2009-016933 filed on Jan. 28, 2009; the entire contents of which are incorporated by reference herein.

BACKGROUND OF THE INVENTION

1. Field of the Invention

The present invention relates to a white ink for an inkjet.

2. Description of the Related Art

Examples of methods used for forming images such as text, pictures or designs on base materials such as films or cardboard include screen printing and gravure printing, but in recent years, inkjet printing, which is effectively a plateless printing technique, has been attracting considerable attention.

When printing to the types of base materials mentioned above, the underlying substrate must be covered to enable better color development within the printed item. A white ink having favorable covering properties is generally used to cover the substrate, and an inorganic pigment, in particular titanium dioxide, is often used as the pigment for this white ink. However, because inorganic pigments such as titanium dioxide have a high specific gravity, suppressing pigment sedimentation tends to be a problem when such pigments are used in low-viscosity inkjet inks.

If the particle size of the titanium dioxide is reduced in order to suppress this pigment sedimentation, then although the level of sedimentation can be reduced, a problem arises in that the white coloring properties tend to deteriorate, resulting in inferior covering properties and a dramatic deterioration in the hiding power of the white ink.

Patent Document 1 (Japanese Patent Laid-Open No. 2004-339388) discloses an aqueous white ink composition that can be used in flexo printing or gravure printing, wherein by using a pigment component composed of titanium dioxide, silica and another white inorganic pigment, a favorable degree of whiteness can be maintained while ensuring good storage stability. However, the pigment component comprises titanium dioxide as the main constituent, and because the disclosed ink is a comparatively high-viscosity ink, if the composition was applied to the preparation of an inkjet ink, then maintaining favorable storage stability would be problematic.

SUMMARY OF THE INVENTION

The present invention has an object of providing a white ink for an inkjet that is capable of suppressing sedimentation of the pigment while maintaining favorable covering properties.

One aspect of the present invention provides a white ink for an inkjet comprising silica, a resin emulsion and water, wherein the amount of the resin emulsion, reported as a mass ratio relative to a value of 1 for the silica, is within a range from 0.10 to 0.45.

DETAILED DESCRIPTION OF THE EMBODIMENTS

A description of embodiments according to the present invention is presented below, but the examples within these embodiments in no way limit the scope of the present invention.

A white ink for an inkjet according to the present invention is capable of suppressing sedimentation of the pigment while maintaining favorable covering properties.

The white ink for an inkjet according to the present invention (hereafter also referred to as simply "the ink") comprises silica, a resin emulsion and water, wherein the amount of the resin emulsion, reported as a mass ratio relative to a value of 1 for the silica, is within a range from 0.10 to 0.45.

When silica is used as the white pigment, because the specific gravity is lower than that of titanium dioxide, the amount of sedimentation can be suppressed, but a problem arises in that the white coloring properties of silica are inferior to those of titanium dioxide.

In the present invention, by including a resin emulsion, and restricting the amount of the resin emulsion to a mass ratio of 0.10 to 0.45 relative to a value of 1 for the silica, satisfactory white color development and favorable covering properties can be obtained even when silica is used as the main constituent. Although not wishing to be bound by theory and the reasons for this observation are not entirely clear, it would be thought that by including the silica and the resin emulsion in this type of mass ratio, voids would be generated within the ink film, and light therefore would undergo diffuse reflection, resulting in improved covering properties.

Further, by using the above mass ratio, even if the amount of silica is large relative to the total mass of the ink, sedimentation of the silica within the ink can be suppressed and the stability of the ink can be improved. This specific mass ratio between the silica and the resin emulsion was only discovered on the basis of the results of repeated testing.

There are no particular restrictions on the silica ($SiO_2$) used, and either a powdered silica or colloidal silica may be used alone, or a combination of the two types of silica may be used.

The dispersion average particle size of the silica is not particularly limited but preferably within a range from 80 to 300 nm, more preferably from 100 to 260 nm, and still more preferably from 120 to 230 nm. By ensuring that the dispersion average particle size of the silica is at least 80 nm, satisfactory color development can be obtained for the silica, and favorable covering properties can be achieved. Provided the dispersion average particle size of the silica is not more than 300 nm, sedimentation of the silica within the ink can be effectively prevented, and the stability of the ink can be favorably maintained. Here, the dispersion average particle size describes a numerical value determined by volume conversion, which is obtained by diluting the dispersion or ink with pure water to obtain a solid fraction of 1%, and then performing measurements using a dynamic light scattering particle size distribution analyzer (this definition also applies below).

Examples of powdered silica products that may be used include Aerosil 90 and OX50 manufactured by Nippon Aerosil Co., Ltd., and the products E-200A, E-220A, K-500, E-1009, E-1011, E-1030, E-150J and E-170 manufactured by Tosoh Silica Corporation. Examples of colloidal silica products that may be used include Snowtex S, OS, XS, OXS, 20, 30, 40, 50, O, AK, O-40, CM, 20L, C, ZL, XL and N manufactured by Nissan Chemical Industries, Ltd., Quartron PL-1, PL-3, PL-7 and PL-20 manufactured by Fuso Chemical Co., Ltd., and Silicaloid, Silicaloid-LL and Silicaloid-A manufactured by Sanko Colloid Chemical Co., Ltd. These products may be used individually or in combination.

The resin emulsion is preferably an oil-in-water (O/W) type resin emulsion. There are no particular restrictions on the resin emulsion, and examples include resin emulsions of acrylic resins, acrylic-styrene resins, urethane resins, vinyl acetate resins and acrylic-vinyl acetate resins, as well as combinations of two or more of these resins. These resin emulsions can be used as fixing agents for fixing colorants to items being printed such as printing papers. Further, they can also act as pigment dispersants.

Water-dispersible polyurethane resins are preferred as the resin emulsion, and specific examples of such resins include Superflex 110, 130, 170, 300, 420, 460, 470, 500, 610, 700, 860, E-2000, E-2500, E-4000 and R-5000 manufactured by Dai-ichi Kogyo Seiyaku Co., Ltd., NeoRez R-9660, R-972, R-9637, R-967 and R-940 manufactured by Kusumoto Chemicals, Ltd., and Adeka Bontighter HUX-380, 401, 290K, 394 and 680 manufactured by Adeka Corporation. These products may be used individually or in combination.

From the viewpoint of ensuring favorable material compatibility with the inkjet head, the resin emulsion is preferably anionic.

The amount (solid fraction) of the resin emulsion, reported as a mass ratio relative to a value of 1 for the silica, is preferably within a range from 0.10 to 0.45, more preferably from 0.10 to 0.42, and still more preferably from 0.15 to 0.30. By ensuring that this mass ratio for the resin emulsion is at least 0.10, a satisfactory mass ratio for the resin emulsion can be ensured, meaning cracking of the ink film can be prevented, and satisfactory fastness can be achieved. Provided the mass ratio is not more than 0.45, a satisfactory level of white color development is obtained from the silica, transparency of the ink film can be favorably maintained at a low level, and favorable covering properties can be obtained.

Although there are no particular restrictions on the amount (solid fraction) of the silica relative to the total mass of the ink, provided the mass ratio between the silica and the resin emulsion satisfies the above range, the amount of silica is preferably within a range from 5 to 30% by mass, more preferably from 10 to 25% by mass, and still more preferably from 10 to 20% by mass. By ensuring that the amount of the silica is at least 5% by mass, satisfactory covering properties can be obtained for the ink film. Provided the amount of the silica is not more than 30% by mass, any increase in the ink viscosity can be favorably suppressed to an appropriate level.

Although there are no particular restrictions on the amount (solid fraction) of the resin emulsion relative to the total mass of the ink, provided the mass ratio between the resin emulsion and the silica satisfies the above range, the amount of the resin emulsion is preferably within a range from 0.5 to 13.5% by mass, more preferably from 1 to 12% by mass, and still more preferably from 2 to 10% by mass.

Although there are no particular restrictions on the water, the use of a water containing minimal impurities, including a pure water such as ion-exchanged water or distilled water, or an ultra pure water is preferred. Although there are no particular restrictions on the amount of the water relative to the total mass of the ink, from the viewpoint of viscosity regulation, the amount of water is preferably within a range from 20 to 80% by mass.

In one preferable embodiment, the ink preferably also comprises titanium dioxide ($TiO_2$). According to the present invention, favorable covering properties can be achieved by ensuring that the silica and the resin emulsion are included in amounts that satisfy the mass ratio range described above. However, the covering properties can be further improved by also including titanium dioxide.

The dispersion average particle size of the titanium dioxide is not particularly limited but preferably within a range from 100 to 250 nm, more preferably from 120 to 230 nm, and still more preferably from 150 to 220 nm. By ensuring that the dispersion average particle size of the titanium dioxide is at least 100 nm, satisfactory color development can be obtained, and favorable covering properties can be achieved. Provided the dispersion average particle size of the titanium dioxide is not more than 250 nm, sedimentation of the titanium dioxide within the ink can be effectively prevented, and the stability of the ink can be favorably maintained.

Achieving satisfactory coloring properties with a titanium dioxide having a dispersion average particle size of 100 to 250 nm is usually difficult due to the small particle size. However, in the present invention, by combining the silica and the resin emulsion in the mass ratio described above, satisfactory coloring properties and favorable covering properties can be achieved even if a titanium dioxide having a small particle size is used. Moreover, because a titanium dioxide having a small particle size can be used, an additional effect is achieved in that sedimentation of the titanium dioxide within the ink can be prevented, thereby ensuring favorable ink stability.

Examples of the titanium dioxide having a dispersion average particle size of 100 to 250 nm include the products A-190, SA-1, STR-100W and STR-100A-LP manufactured by Sakai Chemical Industry Co., Ltd., and the products MPT-136, TTO-V-3 and TTO-V-4 manufactured by Ishihara Sangyo Kaisha, Ltd. These products may be used individually or in combination.

Of these products, the use of a titanium dioxide that has been surface treated with alumina or silica to suppress photocatalytic activity is preferred, and in the case of an aqueous ink, the use of at least silica for the surface treatment is preferred. The amount of the surface treatment is preferably within a range from 5 to 20% by mass of the mass of the titanium dioxide.

The amount of the titanium dioxide, reported as a mass ratio relative to a value of 1 for the silica, is preferably not more than 1.00, more preferably not more than 0.50, and still more preferably not less than 0.10 but not more than 0.30. By ensuring that this mass ratio for the titanium dioxide is not more than 1.00, the amount of sedimentation can effectively be reduced.

In addition to the silica and titanium dioxide described above, the ink of the present invention may also include other white pigments. Examples of these other white pigments include inorganic pigments such as zinc oxide, zinc sulfide, antimony oxide and zirconium oxide. Materials other than inorganic pigments may also be used, including hollow resin microparticles and polymer microparticles. These other materials may be used individually or in combination.

There are no particular restrictions on the total amount (solid fraction) of white pigment, including the silica and titanium dioxide described above, relative to the total mass of the ink, provided the respective amounts of the resin emulsion, the silica and the titanium dioxide satisfy the ranges mentioned above, but in terms of achieving favorable hiding power and ink viscosity, the total amount of white pigment is preferably within a range from 5 to 30% by mass, more preferably from 11 to 30% by mass, and still more preferably from 15 to 25% by mass.

In order to ensure stable dispersion of the pigment, the ink of the present invention preferably also comprises a pigment dispersant. Examples of this pigment dispersant include polymer dispersants and surfactants.

Examples of commercially available products that may be used as the polymer dispersant include the Solsperse series (Solsperse 20000, 27000, 41000, 41090, 43000 and 44000) manufactured by Lubrizol Japan Ltd., the Joncryl series (Joncryl 57, 60, 62, 63, 71 and 501) manufactured by Johnson Polymer, Inc., and polyvinylpyrrolidone K-30 and K-90 manufactured by Dai-ichi Kogyo Seiyaku Co., Ltd.

Examples of the surfactant include anionic surfactants such as the Demol series (Demol EP, N, RN, NL, RNL and T-45) manufactured by Kao Corporation, and nonionic surfactants such as the Emulgen series (Emulgen A-60, A-90, A-500, B-40, L-40 and 420) manufactured by Kao Corporation.

In consideration of the interaction with a pretreatment agent comprising a polyvalent metal salt described below, the pigment dispersant is preferably anionic.

These pigment dispersants may also be used in combinations containing a plurality of different dispersants.

The amount of (the active constituent of) the pigment dispersant differs depending on the nature of the polymer dispersant or surfactant, but when reported as a mass ratio relative to a value of 1 for the titanium oxide within the pigment, is preferably within a range from 0.005 to 0.5, more preferably from 0.01 to 0.5, and still more preferably from 0.01 to 0.1.

A surfactant may also be added to the ink for the purposes of enabling the ink to be discharged stably using an inkjet system, and controlling the penetration of the ink into the item being printed.

The amount of the surfactant varies depending on the type of surfactant used, but is preferably within a range from 0.1 to 10% by mass relative to the total mass of the ink.

Provided the amount of the surfactant is at least 0.1% by mass, the effects of adding the surfactant can be favorably realized, and provided the amount is not more than 10% by mass, the rate of ink penetration into the item being printed can be suppressed to a low level, enabling favorable covering properties to be obtained.

All manner of surfactants may be used, including ionic surfactants, nonionic surfactants and amphoteric surfactants. Examples of the ionic surfactants include anionic surfactants such as Emal 0, 10, 2F, 40 and 20C, Neopelex GS, G-15, G-25 and G-65, Pelex OT-P, TR, CS, TA, SS-L and SS-H, and Demol N, NL, RN and MS, all manufactured by Kao Corporation, and cationic surfactants such as Acetamin 24 and 86, Quartamin 24P, 86P, 60W and 86W, and Sanisol C and B-50, all manufactured by Kao Corporation. Examples of the nonionic surfactants include acetylene glycol-based surfactants such as Surfynol 104E, 104H, 420, 440, 465 and 485, manufactured by Air Products and Chemicals, Inc., and polyoxyethylene alkyl ether-based surfactants such as Emulgen 102KG, 103, 104P, 105, 106, 108, 120, 147, 150, 220, 350, 404, 420, 705, 707, 709, 1108, 4085 and 2025G, manufactured by Kao Corporation. Examples of the amphoteric surfactants include Amphitol 20BS, 24B, 86B, 20YB and 20N, manufactured by Kao Corporation. These surfactants may also be used in combinations containing two or more different surfactants.

From the viewpoints of viscosity regulation and a moisture retention effect, a water-soluble organic solvent may also be added to the ink. Examples of this water-soluble organic solvent include glycols such as ethylene glycol, diethylene glycol, triethylene glycol, tetraethylene glycol, pentaethylene glycol, propylene glycol, dipropylene glycol and tripropylene glycol, glycerol, acetins, glycol derivatives such as triethylene glycol monomethyl ether, triethylene glycol monobutyl ether, tetraethylene glycol monomethyl ether, tetraethylene glycol dimethyl ether and tetraethylene glycol diethyl ether, as well as triethanolamine, 1-methyl-2-pyrrolidone, β-thiodiglycol, sulfolane and 1,3-propanediol. Two or more of these solvents may also be used in combination.

The amount of the water-soluble organic solvent relative to the total mass of the ink is preferably within a range from 1 to 30% by mass, and more preferably from 5 to 10% by mass.

Besides each of the components described above, other additives typically used within inks may also be added as required, including wetting agents (moisture retention agents), antifoaming agents, fixing agents, preservatives, viscosity regulators (pH regulators) and antioxidants.

Polyhydric alcohols can be used as the wetting agent.

An electrolyte may be added to the ink to regulate the viscosity and/or the pH of the ink. Examples of the electrolyte include sodium sulfate, potassium hydrogen phosphate, sodium citrate, potassium tartrate and sodium borate, and two or more of these electrolytes may also be used in combination. Compounds such as sulfuric acid, nitric acid, acetic acid, sodium hydroxide, potassium hydroxide, ammonium hydroxide and triethanolamine may also be used as either ink thickening assistants or pH regulators.

By adding an antioxidant, oxidation of the ink components can be prevented, enabling the storage stability of the ink to be further improved. Examples of compounds that may be used as the antioxidant include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented and the storage stability of the ink can be further improved. Examples of compounds that may be used as the preservative include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

The ink viscosity may be adjusted as appropriate, although from the viewpoint of the discharge properties, is preferably within a range from 1 to 30 mPa·s. This viscosity is measured at 23° C. by raising the shear stress from 0 Pa at a rate of 0.1 Pa/s, and refers to the ink viscosity at 10 Pa.

There are no particular restrictions on the method used for producing the white ink, and the desired ink can be obtained by appropriately mixing the various components together. For example, when a silica and a titanium dioxide are used as white pigments, the ink may be prepared by mixing the titanium dioxide with water, and if required a pigment dispersant, to prepare a white pigment dispersion, and then mixing this white pigment dispersion with the silica, the resin emulsion, and if required a surfactant and a water-soluble organic solvent, thus completing preparation of the final ink composition.

Following printing of the white ink onto the item being printed, hot press drying may be conducted during drying of the ink. By performing a heat treatment at 100 to 180° C. following printing of the ink, not only is the ink dried, but the resin emulsion generates a film, enabling a strong ink film to be produced. Moreover, in those cases where titanium dioxide is included within the ink, because the ink incorporates two types of inorganic pigment, namely silica and titanium dioxide, the heat resistance of the ink improves, and the melt temperature of the ink upon heating increases, enabling penetration of the ink into the item being printed to be prevented. There are no particular restrictions on the heat treatment time or conditions, and heat treatment at 160° C. for approximately 60 seconds is adequate.

In the present invention, in those cases where the ink is to be printed on an item that exhibits ready ink absorption, such as a paper or fabric, the use of a pretreatment agent that causes aggregation of the titanium dioxide, the colloidal silica and the resin emulsion enables more favorable covering properties to be obtained.

The pretreatment agent is used by application to the item to be printed prior to printing of the white ink. The pretreatment agent is applied to at least the region that is to be printed with the white ink, but may also be applied to the entire item to be printed.

In order to cause aggregation of the resin emulsion and the pigment within the ink, enabling formation of an ink film even on a dark colored fabric, the pretreatment agent preferably contains 1 to 25% by mass of a polyvalent metal salt. If this amount is less than 1% by mass, then forming an ink film becomes difficult, whereas no additional effect is observed even if the amount exceeds 25% by mass. The polyvalent metal salt used is composed of a divalent or higher polyvalent metal ion and an anion that bonds to this polyvalent metal ion. Examples of the divalent or higher polyvalent metal ion include $Ca^{2+}$, $Mg^{2+}$, $Cu^{2+}$, $Ni^{2+}$, $Zn^{2+}$ and $Ba^{2+}$. Examples of the anion include $Cl^-$, $NO_3^-$, $CH_3COO^-$, $I^-$, $Br^-$ and $ClO_3^-$. Specific examples of the salt include calcium nitrate, magnesium nitrate, copper nitrate, calcium acetate and magnesium acetate. These metal salts may be used individually or in combination.

A resin emulsion may be added to the pretreatment agent for the purposes of improving the durability and suppressing fuzzing of the surface of the fabric. The resin emulsion used preferably has an absolute value for the zeta potential (mV) of less than 10. If this value exceeds 10, then the effect of the polyvalent metal salt contained within the pretreatment agent means maintaining favorable stability may become difficult. Examples of resin emulsions having a zeta potential of less than 10 include urethane resins such as Superflex 500, E-2000, E-2500, E-4000 and E-5000 manufactured by Dai-ichi Kogyo Seiyaku Co., Ltd., and Adeka Bontighter HUX-822 and 830 manufactured by Adeka Corporation, vinyl acetate resins such as Vinyblan 1245L, 2680, 2682 and 2684 manufactured by Nissin Chemical Industry Co., Ltd., and acrylic resins such as Voncoat AN-402, R-3310 and R-3360 manufactured by DIC Corporation. These resin emulsions may be used individually or in combination.

The amount of the resin emulsion added to the pretreatment agent is preferably within a range from 1 to 20% by mass relative to the total mass of the pretreatment agent. if the amount is less than 1% by mass, then achieving the effects described above becomes difficult, whereas if the amount exceeds 20% by mass, then removing the pretreatment agent adhered to non-printed portions by washing becomes difficult, and there is a possibility that the commercial value of the printed item such as a fabric may deteriorate.

From the viewpoints of viscosity regulation and a moisture retention effect, a water-soluble organic solvent may also be added to the pretreatment agent. Examples of water-soluble organic solvents that may be used include the same solvents as those listed above for the ink.

Besides the components described above, the pretreatment agent may also include the types of additives typically used within inks such as preservatives, viscosity regulators and antioxidants.

There are no particular restrictions on the method used for applying the pretreatment agent to the item to be printed such as a paper or fabric, and a method such as a spraying method, dipping method, padding method, coating method, inkjet printing method or screen printing method may be used.

Following application of the pretreatment agent, the item to be printed is preferably subjected to a heat treatment at approximately 100 to 180° C. This heat treatment is used for drying the water content within the pretreatment agent, meaning that when the ink is subsequently printed, water within the pretreatment agent is prevented from mixing with the ink and causing image bleeding. Fuzzing of the surface of the printed item such as a fabric can also be remedied. There are no particular restrictions on the heat treatment time or conditions, and a treatment at 160° C. for approximately 30 seconds is adequate.

The white ink for an inkjet described above is suited to printing using an inkjet printer. The inkjet printer used for conducting the printing may employ any of various printing systems, including a thermal system, piezo system or electrostatic system, and discharges the white ink for an inkjet according to the present invention from nozzles within the inkjet head based on a digital signal, and adheres the discharged ink droplets to the item being printed such as a sheet of paper. A printed item obtained in this manner exhibits excellent covering properties, and is therefore able to favorably cover the underlying substrate. Further, following printing of the white ink for an inkjet, by performing subsequent printing using any of the various colored inks, favorable color development of the colored inks can be achieved.

Examples

A more detailed description of the present invention is provided below based on a series of examples, although the present invention is in no way limited by these examples.

<Preparation of Pretreatment Agent>

58.7 g of ion-exchanged water was added to 15 g of calcium acetate tetrahydrate (manufactured by Wako Pure Chemical Industries, Ltd.), and following complete dissolution, 26.3 g of Vinyblan 1245L (solid fraction: 38%, manufactured by Nissin Chemical Industry Co., Ltd) was added and stirred. The mixture was then passed through a metal mesh with a pore size of 20 μm to remove any foreign matter, thus yielding the pretreatment agent.

<Preparation of White Pigment Dispersions>

Each of the components of the white pigment dispersions listed in Table 1 were mixed together, and in each case the resulting mixture was dispersed using a beads mill (Dyno-Mill KDL model A, manufactured by Shinmaru Enterprises Corporation), under conditions including a 0.5 mmΦ zirconia beads packing rate of 80% and a residence time of 2 minutes, thus yielding a series of white pigment dispersions.

<Preparation of Inks>

The white pigment dispersions described above were blended with each of the ink formulation components listed in Table 2, and any coarse particles were removed using a 5 μm membrane filter, thus completing preparation of a series of inks. The final ink formulations are detailed in Table 3.

The components within Table 1 to Table 3 are listed below.

Titanium oxide: STR-100W (manufactured by Sakai Chemical Industry Co., Ltd.)

Titanium oxide: R-21 (manufactured by Sakai Chemical Industry Co., Ltd.)

Silica: OX50 (manufactured by Nippon Aerosil Co., Ltd.)

Silica: Snowtex ZL (a colloidal silica, solid fraction: 40%, manufactured by Nissan Chemical Industries, Ltd.)

Dispersant: Demol EP (active constituent: 25%, manufactured by Kao Corporation)

Surfactant: S465 (Surfynol 465, manufactured by Air Products and Chemicals, Inc.)

Resin Emulsion: SF460 (Superflex 460, solid fraction: 38%, zeta potential: −61.6 mV, manufactured by Dai-ichi Kogyo Seiyaku Co., Ltd.)

Water-soluble organic solvents: ethylene glycol (manufactured by Wako Pure Chemical Industries, Ltd.) and glycerol (manufactured by Wako Pure Chemical Industries, Ltd.)

TABLE 1

White pigment dispersions

| Mass % | | Example 1 | Example 2 | Example 3 | Example 4 | Example 5 | Comparative example 1 | Comparative example 2 | Comparative example 3 |
|---|---|---|---|---|---|---|---|---|---|
| Titanium oxide | STR-100W | 25.00 | 25.00 | 25.00 | 25.00 | — | 25.00 | 25.00 | — |
|  | R-21 | — | — | — | — | — | — | — | 25.00 |
| Dispersant | Demol EP (active constituent) | 0.25 | 0.25 | 0.25 | 0.25 | — | 0.25 | 0.25 | 0.25 |
|  | Ion-exchanged water | 74.75 | 74.75 | 74.75 | 74.75 | — | 74.75 | 74.75 | 74.75 |
|  | Total | 100.00 | 100.00 | 100.00 | 100.00 | — | 100.00 | 100.00 | 100.00 |

TABLE 2

Ink formulations

| Mass % | | Example 1 | Example 2 | Example 3 | Example 4 | Example 5 | Comparative example 1 | Comparative example 2 | Comparative example 3 |
|---|---|---|---|---|---|---|---|---|---|
| White pigment dispersion | | 20.00 | 20.00 | 20.00 | 20.00 | — | 40.00 | 20.00 | 40.00 |
| Surfactant | S465 | 0.50 | 0.50 | 0.50 | 0.50 | 0.50 | 1.00 | 0.50 | 1.00 |
| Resin emulsion | SF460 (solid fraction) | 5.00 | 5.00 | 2.00 | 8.40 | 5.00 | 10.00 | 10.00 | 10.00 |
| Water-soluble organic solvent | Ethylene glycol | 5.00 | 5.00 | 5.00 | 3.70 | 5.00 | 10.00 | 5.00 | 10.00 |
|  | Glycerol | 5.00 | 5.00 | 5.00 | 3.70 | 5.00 | 10.00 | 5.00 | 10.00 |
|  | Ion-exchanged water | 44.50 | 44.50 | 47.50 | 43.70 | 64.50 | 29.00 | 39.50 | 29.00 |
| Silica | OX50 | — | 20.00 | — | — | 20.00 | — | — | — |
|  | Snowtex ZL (solid fraction) | 20.00 | — | 20.00 | 20.00 | — | — | 20.00 | — |
|  | Total | 100.00 | 100.00 | 100.00 | 100.00 | 100.00 | 100.00 | 100.00 | 100.00 |

<Evaluations>

The evaluations described below were performed on each of the inks from the examples and comparative examples. The results of these evaluations are listed in Table 3, together with the final ink formulations. The results for the dispersion average particle sizes for the pigments are listed in Table 4.

Dispersion Average Particle Sizes for the Pigments

The dispersion average particle sizes were determined for the silica and titanium dioxide materials used in the examples and comparative examples. Using a dynamic light scattering particle size distribution analyzer (LB500, manufactured by Horiba, Ltd.), each dispersion or ink was diluted with pure water to obtain a solid fraction of 1%, and measurements were then conducted. A numerical value was determined by volume conversion.

Application to Fabric

The pretreatment agent was applied uniformly to a 100% cotton black T-shirt using an air brush. Following application, a heat treatment was performed at 160° C. for 30 seconds. 0.91 g of the ink was pre-weighed for application to a 7 cm×7 cm area of the fabric, and was then applied uniformly to the pretreated fabric using an air brush. Following application, a heat treatment was performed at 160° C. for 60 seconds.

Hiding Power

The hiding power of the printed fabric was evaluated by measuring the OD value using a Macbeth reflection densitometer RD920, which was then evaluated against the criteria below.

A: less than 0.30
B: 0.30 to 0.59
C: 0.60 or greater

Sedimentation 10 ml of the ink was placed in a test tube with an outer diameter of 15 mm, the test tube was left to stand at room temperature for one week, and the state of development of a supernatant liquid was evaluated visually against the criteria below.

G: no supernatant liquid had developed
NG: a distinct supernatant liquid had developed

TABLE 3

Final ink formulations

| | Mass % | Example 1 | Example 2 | Example 3 | Example 4 | Example 5 | Comparative example 1 | Comparative example 2 | Comparative example 3 |
|---|---|---|---|---|---|---|---|---|---|
| Titanium dioxide | STR-100W | 5.00 | 5.00 | 5.00 | 5.00 | — | 10.00 | 5.00 | — |
|  | R-21 | — | — | — | — | — | — | — | 10.00 |
| Silica | OX50 | — | 20.00 | — | — | 20.00 | — | — | — |
|  | Snowtex ZL (solid fraction) | 20.00 | — | 20.00 | 20.00 | — | — | 20.00 | — |
| Dispersant | Demol EP (active constituent) | 0.05 | 0.05 | 0.05 | 0.05 | — | 0.10 | 0.05 | 0.10 |

TABLE 3-continued

Final ink formulations

| Mass % | | Example | | | | | Comparative example | | |
|---|---|---|---|---|---|---|---|---|---|
| | | 1 | 2 | 3 | 4 | 5 | 1 | 2 | 3 |
| Surfactant | S465 | 0.50 | 0.50 | 0.50 | 0.50 | 0.50 | 1.00 | 0.50 | 1.00 |
| Resin emulsion | SF460 (solid fraction) | 5.00 | 5.00 | 2.00 | 8.40 | 5.00 | 10.00 | 10.00 | 10.00 |
| Water-soluble organic solvent | Ethylene glycol | 5.00 | 5.00 | 5.00 | 3.70 | 5.00 | 5.00 | 5.00 | 10.00 |
| | Glycerol | 5.00 | 5.00 | 5.00 | 3.70 | 5.00 | 5.00 | 5.00 | 10.00 |
| | Ion-exchanged water | 59.45 | 59.45 | 62.45 | 58.65 | 64.50 | 58.90 | 54.45 | 58.90 |
| | Total | 100.00 | 100.00 | 100.00 | 100.00 | 100.00 | 100.00 | 100.00 | 100.00 |
| Mass ratio of resin emulsion relative to a value of 1 for silica | | 0.25 | 0.25 | 0.10 | 0.42 | 0.25 | — | 0.50 | — |
| Mass ratio of titanium dioxide relative to a value of 1 for silica | | 0.25 | 0.25 | 0.25 | 0.25 | — | — | 0.25 | — |
| Total mass of pigment (combined mass of titanium dioxide and silica) | | 25.00 | 25.00 | 25.00 | 25.00 | 20.00 | 10.00 | 25.00 | 10.00 |
| Evaluations | Hiding power | A (0.17) | A (0.25) | A (0.30) | A (0.22) | B (0.36) | C (0.78) | C (0.65) | B (0.49) |
| | Sedimentation (supernatant liquid) | G | G | G | G | G | G | G | NG |

TABLE 4

Pigment dispersion average particle sizes

| Pigment | | Dispersion average particle size (nm) |
|---|---|---|
| Titanium dioxide | STR-100W | 220 |
| | R-21 | 290 |
| Silica | OX50 | 180 |
| | Snowtex ZL | 130 |

As detailed in Table 3, in examples 1 to 5, the mass ratio of the resin emulsion relative to a value of 1 for the silica was within a range from 0.10 to 0.45, and in each example favorable results were obtained, including excellent hiding power and no ink sedimentation. Examples 1 to 4 contained titanium dioxide, and yielded even more superior hiding power. Example 5 contained no titanium dioxide, and although the hiding power was somewhat inferior compared with examples 1 to 4, the hiding power was still sufficient for practical application.

Further, the viscosities of the inks of examples 1 to 5 were within an appropriate range, and were able to be used as white inkjet inks.

In comparative example 1, titanium dioxide was added without adding any silica, and the hiding power was poor. In comparative example 2, the mass ratio of the resin emulsion relative to a value of 1 for the silica exceeded 0.45, and the hiding power was poor. In comparative example 3, titanium dioxide was added without adding any silica, and because the particle size of the titanium dioxide was larger, the hiding power was superior to that observed in comparative example 1, but sedimentation occurred.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A white ink for an inkjet, comprising a silica, a resin emulsion comprising a solid fraction, and water, wherein an amount of the solid fraction of the resin emulsion, reported as a mass ratio of the amount of the solid fraction of the resin emulsion relative to an amount of the silica, is within a range from 0.10:1 to 0.45:1.

2. The white ink for an inkjet according to claim 1, further comprising a titanium dioxide.

3. The white ink for an inkjet according to claim 2, wherein an amount of the titanium dioxide, reported as a mass ratio of the amount of titanium dioxide relative to an amount of the silica, is not more than 1.00:1.

4. The white ink for an inkjet according to claim 1, wherein an amount of the silica relative to the total mass of the ink is within a range from 5 to 30% by mass and an amount of the solid fraction of the resin emulsion relative to the total mass of the ink is within a range from 0.5 to 13.5% by mass.

* * * * *